Jan. 4, 1949.   C. L. UHING   2,458,319
SOLDERING IRON
Filed Dec. 11, 1945

INVENTOR
Cyril L. Uhing
BY Henry J. R. Metzler
Agt.

Patented Jan. 4, 1949

2,458,319

UNITED STATES PATENT OFFICE 2,458,319

SOLDERING IRON

Cyril L. Uhing, Hartington, Nebr.

Application December 11, 1945, Serial No. 634,209

2 Claims. (Cl. 219—27)

This invention relates to soldering irons, an object of the invention being to provide a soldering iron which has a compartment for solder so that the heat of the iron melts the solder and the discharge of the solder from the iron is manually controlled.

In the use of ordinary soldering irons it has been the practice for the workman to heat the iron and applying solder to the end thereof to cause the solder to melt and to position the solder on the work by the hot iron. This not only requires two hands but also is a difficult operation in many cases and a slow one because the solder frequently chills too soon. Furthermore, there is a great waste of material, and it is the purpose of my invention to provide a soldering iron which contains its own solder and which allows the same to escape in molten form so that it can be applied wherever desired and the entire manipulation of the iron be controlled by one hand so that the iron can be easily moved into and out of awkard places.

A further object is to provide an electrically heated soldering iron having a chamber for solder in the handle and having manually controlled means to regulate the escape of solder from the hot iron.

With these and other objects in view, the invention consists in certain novel features of construction and combinations and arrangements of parts which will be more fully hereinafter described and pointed out in the claims.

In the accompanying drawing—

Similar reference characters refer to similar parts throughout the several views.

Figure 1:
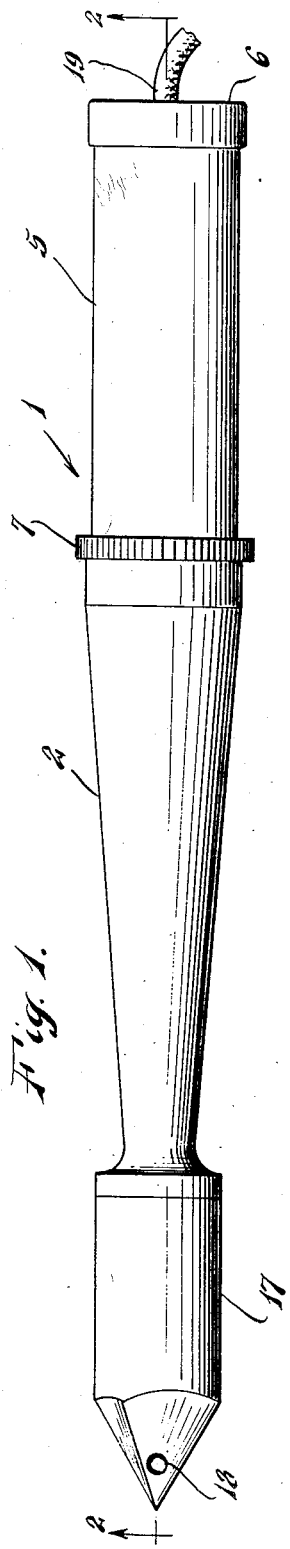
Figure 1 is a side elevation of a preferred embodiment of my invention.
Figure 2:
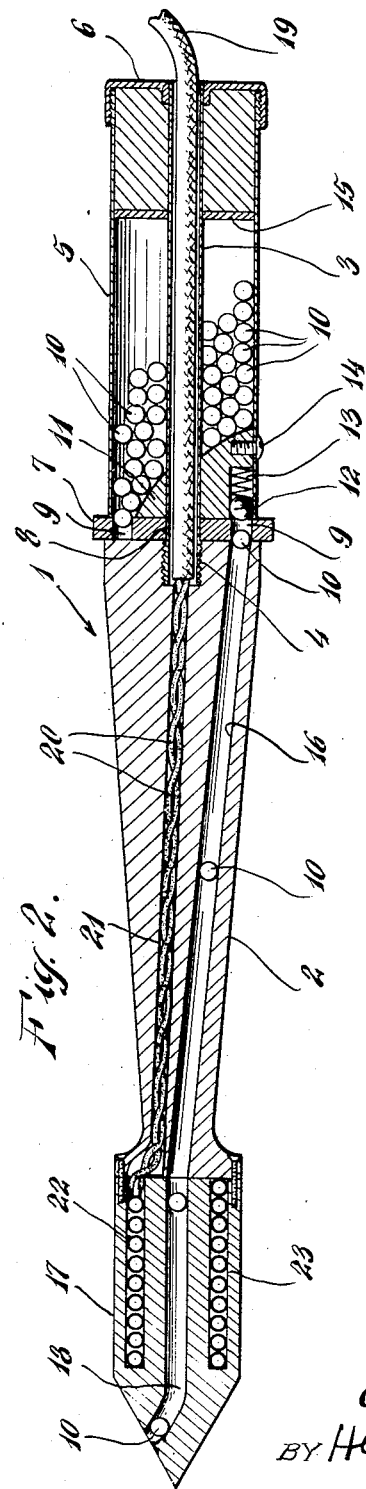
Fig. 2 is a longitudinal sectional-view on the line 2—2 of Fig. 1.
Figure 3:
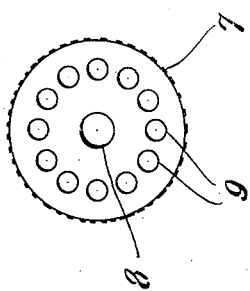
Fig. 3 is a plan view of a detail which will be explained hereinafter.

In the drawing the numeral 1 denotes the body portion of my improved solder dispensing soldering iron, which has a longitudinal stem 2 from which extends a tube 3. The tube 3 is secured to the upper portion of the stem 2 by means of a screw connection 4 or in any other suitable manner. The tube 3 extends through a hollow handle, which consists of a tubular member 5 to which a top-cover 6 is detachably secured.

A disk 7, which has a circular row of apertures 9 and a central bore 8 is rotatably arranged on the lower portion of tube 3 between the handle part 5 and the upper end portion of stem 2. The outer diameter of the disk 7 is larger than that of the handle part 5, and the periphery of disk 7 is provided with notches or with a roughage, so that it can be turned by the thumb of the hand which holds the handle of my improved soldering iron.

A plurality of particles or small balls 10 of solder are contained within the hollow handle. It is possible to fill the entire handle with solder particles or balls 10, into which flux is melted preferably, after removing of the cap or top cover 6. However, in order to make the filled handle not too heavy, I prefer to provide a spacing plate 15 within the handle part 5 and to fill the space between the plate 15 and the cover 6 with some light weight material. This material and the plate 15 are preferably connected to the cover 6, so that the latter can be removed together with plate 15 and with said light weight material. In this way the operator of my improved soldering iron is prevented from filling the entire handle with heavy soldering material, thus keeping the iron within such weight limits which allow it to be operated without effort. Instead of light weight material there can also be arranged between the plate 15 and the cover 6 any suitable switching mechanism for controlling the current used for heating the iron.

While the solder particles 10 may be of any suitable shape or size, I prefer to make them as balls of about one-eight of an inch in diameter. A supporting member 11 is arranged in the lower portion of the hollow handle part 5 and is secured thereto by means of one or more screws 14 or in any other suitable manner. The supporting member 11 has a top surface which is downwardly inclined toward a passage through which the solder balls 10 pass from the handle into the perforations or apertures 9 of disk 7, so that—when disk 7 is rotated—one ball 10 will slide into each aperture 9. The thickness of disk 7 is the same as is the diameter of the balls 10. Opposite to the passage just mentioned, there is in the supporting member 11 a bore 13 whose orifice is adjacent the apertures 9 in disk 7. In the bore 13 there is a ball 12 slidably arranged. The ball 12 is somewhat larger in diameter than are the balls 10 and the apertures 9, and a spring, which is above ball 12 in the bore 13, presses the ball 12 toward the disk 7. A longitudinal solder channel 16 extends through the stem 2 and has its upper orifice opposite to the bore 13, while its lower orifice is in alignment with the solder channel 18 which extends through the soldering tip 17. As previously referred to, each of the apertures 9 of disk 7 contains one solder ball 10, and when the disk is turned so that one of the apertures 9 is in alignment with the bore 13, the ball 12 snatches partially into said aperture 9 and projects the ball 10 which is in said aperture, through the channels 16 and 18. This snatching of the ball 12, which is preferably of steel or of any other suitable hard material, also stops the rotation of disk 7 momentarily when it is manipulated by the thumb as previously described, and it serves to prevent an inadverted turning of disk 7.

The lower orifice of the channel 18 is somewhat smaller in diameter than is the main portion of channel 18, so that each solder ball 10 is stopped, when it has traveled through the channels 16 and 18, until it is molten by the heat emanating from the electric heating element 22, which is contained in the recess 23. In this way each ball 10 can leave the soldering tip only as liquid solder, which can be applied directly to the objects which are to be soldered. The heating element 22 is energized by a current which is led through wires 19 and 20, and said wires are extended through the tube 3 and through a wire bore 21 in the stem 2.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might to be said to fall therebetween.

Having thus fully described my said invention, what I claim as new and desire to secure by Letters Patent is:

1. In a solder dispensing electric soldering iron, the combination of a hollow handle which contains a plurality of particles of solder with flux melted into said particles, a tube axially extended through said handle, with a perforated disk of larger diameter than said handle being rotatable on that portion of said tube which projects beyond said handle, and a stem through which are extended a longitudinal wire bore and a longitudinal solder channel and which is secured to said projecting tube portion beyond said disk and is provided at its lower end portion with a soldering tip and a heating element; electrical conductors leading from said heating element through said wire bore through said tube; and means for projecting one solder particle at a time from one of the disk perforations through said solder channels; said handle having a passage adjacent said disk for allowing said solder particles to pass from said handle into said disk perforations, and the diameter of the orifice of the channel in said tip being smaller than the diameter of the remaining channel portions; all substantially as set forth.

2. In a solder dispensing electric iron, a hollow handle which contains particles of solder with flux melted thereinto, a stem through which are extended a longitudinal wire bore and a longitudinal solder channel and to which is secured at one end a tube that extends through said handle and at the other end a soldering tip containing a heating element and having a solder channel which is in alignment with the channel in said stem; a disk of a larger outer diameter than said handle having a circular row of perforations and being rotatable on a portion of said tube between said handle and said stem; electrical conductors leading from said heating element through said wire bore and through said tube; a supporting member being arranged in the lower portion of said hollow handle and having a top surface which is inclined toward a passage through which said solder particles pass from said handle into the perforations of said disk; a ball whose diameter is somewhat larger than the diameter of said disk perforations being slidably arranged in a bore in said supporting member adjacent said disk perforations and opposite the entrance opening of said solder channel; and resilient means for pressing said ball toward said disk; the diameter of the orifice of the channel in said tip being smaller than the diameter of the remaining channel portions; all substantially as described.

CYRIL L. UHING.

REFERENCES CITED

The following references are of record in the file of this patent:

UNITED STATES PATENTS

| Number | Name | Date |
| --- | --- | --- |
| 672,433 | Arnaman et al. | Apr. 23, 1901 |
| 1,641,604 | Russell | Sept. 6, 1927 |
| 1,691,052 | Fay | Nov. 13, 1928 |
| 1,928,576 | Stedley | Sept. 26, 1933 |